(12) United States Patent
Ohr

(10) Patent No.: US 6,920,538 B1
(45) Date of Patent: Jul. 19, 2005

(54) SYSTEM AND METHOD FOR PREVENTING SECTOR SLIPPING IN A STORAGE AREA NETWORK

(75) Inventor: James Ohr, St. Paul, MN (US)

(73) Assignee: VERITAS Operating Corporation, Mountain View, CA (US)

( * ) Notice: Subject to any disclaimer, the term of this patent is extended or adjusted under 35 U.S.C. 154(b) by 0 days.

(21) Appl. No.: 10/800,239

(22) Filed: Mar. 12, 2004

Related U.S. Application Data

(63) Continuation of application No. 09/924,228, filed on Aug. 7, 2001, now Pat. No. 6,721,851.

(51) Int. Cl.[7] .............................................. G06F 12/00
(52) U.S. Cl. ...................... 711/163; 711/114; 707/204
(58) Field of Search .......................... 711/4, 112, 114, 711/133, 154, 161, 162, 165; 707/10, 204; 714/5, 6; 710/32, 34, 59; 709/203, 225, 217–219

(56) References Cited

U.S. PATENT DOCUMENTS

| | | | |
|---|---|---|---|
| 5,692,155 A | * 11/1997 | Iskiyan et al. | 711/162 |
| 5,719,983 A | * 2/1998 | Henderson et al. | 386/70 |
| 6,029,166 A | 2/2000 | Mutalik et al. | 707/3 |
| 6,173,377 B1 | * 1/2001 | Yanai et al. | 711/162 |
| 6,209,070 B1 | * 3/2001 | Reed et al. | 711/165 |
| 6,353,878 B1 | * 3/2002 | Dunham | 711/162 |
| 6,363,385 B1 | * 3/2002 | Kedem et al. | 707/10 |
| 6,434,681 B1 | * 8/2002 | Armangau | 711/162 |
| 6,549,992 B1 | * 4/2003 | Armangau et al. | 711/162 |
| 6,721,851 B2 | * 4/2004 | Ohr | 711/133 |

OTHER PUBLICATIONS

Nicolett, "SAN Exploitation for Backup: Will You Go Serverless?", GartnerGroup RAS Services, T–09–1183, Sep. 16, 1999.

* cited by examiner

*Primary Examiner*—Pierre M. Vital
(74) *Attorney, Agent, or Firm*—Meyertons Hood Kivlin Kowert & Goetzel, P.C.; B. Noël Kivlin

(57) ABSTRACT

A system for protecting a block in a destination storage device including a data mover operable to move data from a source storage device to the block, and a controller coupled to the data mover, the controller operable to detect an application write request to the block and to stall the application write request while a data move operation initiated by the data mover is terminated.

2 Claims, 7 Drawing Sheets

SYSTEM AND METHOD FOR PREVENTING SECTOR SLIPPING IN A STORAGE AREA NETWORK

This application is a continuation of U.S. patent application Ser. No. 09/924,228, entitled "SYSTEM AND METHOD FOR PREVENTING SECTOR SLIPPING IN A STORAGE AREA NETWORK", filed Aug. 7, 2001, now U.S. Pat. No. 6,721,851.

BACKGROUND OF THE INVENTION

1. Field of the Invention

The present invention relates generally to data protection and more particularly to a system and method for solving the problem of sector slipping in a Storage Area Network.

2. Description of the Prior Art

Recent developments in storage solutions have led to the increased utilization by enterprises of Storage Area Networks (SANs) to provide'storage consolidation, reliability, availability, and flexibility. Factors driving these developments include the increase in the amount of on-line data, data protection requirements including efficient and reliable data back-up, and rapidly increasing disk bit densities.

As illustrated in FIG. 1, an Information Technology ("IT") Organization generally designated 100 includes a SAN 110 coupled between storage devices 120 and servers 130. A Local Area Network ("LAN") 140 networks clients 150 to servers 130. The SAN 110 is conventionally a high-speed network that allows the establishment of direct connections between storage devices 120 and servers 130. In the illustrated IT Organization 100, the SAN 110 is shared between servers 130, and allows for the sharing of storage devices 120 between the servers 130 providing greater availability and reliability of storage.

Third party copy is a method of transferring data directly between storage devices 120 in a SAN 110 using a data mover 200 such as illustrated in FIG. 2. Data mover 200 may be disposed within a storage router or another SAN network component (not shown) or within a storage device such as disk array 220. The connection between the client or application server 210, 230 and the data mover 200 is conventionally a channel protocol like Small Computer System Interface ("SCSI") or fibre channel connected directly to the storage devices 220 or storage device controllers (e.g. RAID controllers).

Data mover 200 is capable of initiating and controlling data movement on the SAN 110 at the direction of commands issued by other devices on the SAN 110. To initiate data transfer from a SAN source storage device, such as tape drive 240, to a SAN destination storage device, such as disk array 220, an application server such as server 210, issues a copy command to data mover 200. The application server 210 manages the control information for the data transfer while the data mover 200 performs the actual data transfer from device 240 to device 220. The application server 210 conventionally has ownership of a file system or database that resides on the SAN destination storage device 220.

As illustrated in FIG. 2, the storage devices 220 and 240 are coupled to the SAN 110, the SAN 110 including the data mover 200. Alternatively, and as illustrated in FIG. 3, the SAN source storage device, such as a tape drive 340, may be directly coupled to the SAN 110 through data mover 300. A proprietary system, such as illustrated in FIG. 4, includes a data mover 400 coupled between the source storage device 410 and the destination storage device 420. While the data movers 200, 300, and 400 have been illustrated as independent devices, it will be appreciated by those skilled in the art that data movers may be functionally implemented in storage device controllers.

Storage devices are conventionally designed to provide data to servers using one of two methods, either block-level or file-level access. Applications are optimized for either type of I/O access and both types of I/O access are usually supported within a customer site. File-level I/O is typically associated with LAN-based access while block-level access is associated with SAN-based access.

To initiate third party copy data transfers in the SAN 110, the client or application server 210 generally provides the data mover 200 (FIG. 2) with the addresses of the source and destination devices and a list of data extents that describe the destination location. In the case of a block-to-block data transfer, both source and destination extents are specified. The extents include the starting location of the data blocks and the number of blocks to be transferred.

For the purposes of the present specification, the destination device for the data movement is a block (disk) device on which a file system or database resides and the source of the data can be any block or stream device (a serial device, i.e., a tape drive).

Due to the capability of file systems and database management systems to reorganize or write to the data residing on the destination device asynchronously of the third party copy operation, there is considerable risk in moving data into a live file system or database. The potential error conditions that arise due to a reorganization of the destination device occur after an extent list initiated by a third party copy request has been generated and sent to the data mover 200. The potential error conditions are referred to as sector slipping events and manifest themselves as two error states on the destination block storage device.

A first sector slipping error state involves a movement of data or allocated space from the destination extents to another physical location (volume reorganization). As illustrated in FIG. 5 Volume A includes destination blocks 510 corresponding to destination extents that are to be written by a third party copy operation. Destination blocks 510 are shown as being initially located or allocated on Disk 1 500. Some time after the list of data extents has been provided to data mover 200, but before the third party copy operation has completed, an error is detected on Disk 1 500 which causes the volume manager to move all data from Disk 1 500 to Disk 2 530.

Since the third party copy operation has not yet completed and the destination blocks 510 have moved, there exists the possibility that the destination blocks 510 moved from Disk 1 500 to Disk 2 530 will not reflect all the data intended to be copied that is being written by the third party copy. Furthermore, the copy manager that is doing the block copy has no way of knowing that the reorganization is taking place and continues to move blocks into the destination blocks 510 on Disk 1 500 rather than to blocks 540 on Disk 2 530 even though the volume has been moved.

A second sector slipping error state involves the overwriting of data following a volume reorganization. With reference to FIG. 6, destination blocks 600, located on Disk 1 610, are to be written by a third party copy operation. While the third party copy operation is in progress, the destination blocks may be concurrently written by application "A" data 620. This situation occurs generally due to a reallocation of disk space by an operation such as a disk optimization. Since the copy operation continues to write data to destination blocks 600, the data stored by application "A" may potentially be corrupted and unreliable.

What is needed is a system and method for solving the problem of sector slipping when writing data into a live environment.

SUMMARY OF THE INVENTION

The present invention includes a block protection scheme within the block storage array to prevent a third party copy operation from writing data into locations that have become invalid due to a sector slipping event. The block protection scheme includes stalling any write operation while awaiting the cancellation of the third party copy operation. After the cancellation of the third party copy operation the original write from the host is allowed to complete.

In another aspect of the invention, an algorithm provides a stable copy into a live file system or database using a third party copy operation. The algorithm detects any changes in the data allocation that are not detected by the block protection scheme.

These and other features of the invention, as well as additional objects, advantages, and other novel features of the invention, will become apparent to those skilled in the art upon reading the following detailed description and accompanying drawings.

In order that the present invention may be more readily understood, the following description is given, merely by way of example, reference being made to the accompanying drawings.

DETAILED DESCRIPTION OF THE INVENTION

Figure 1:
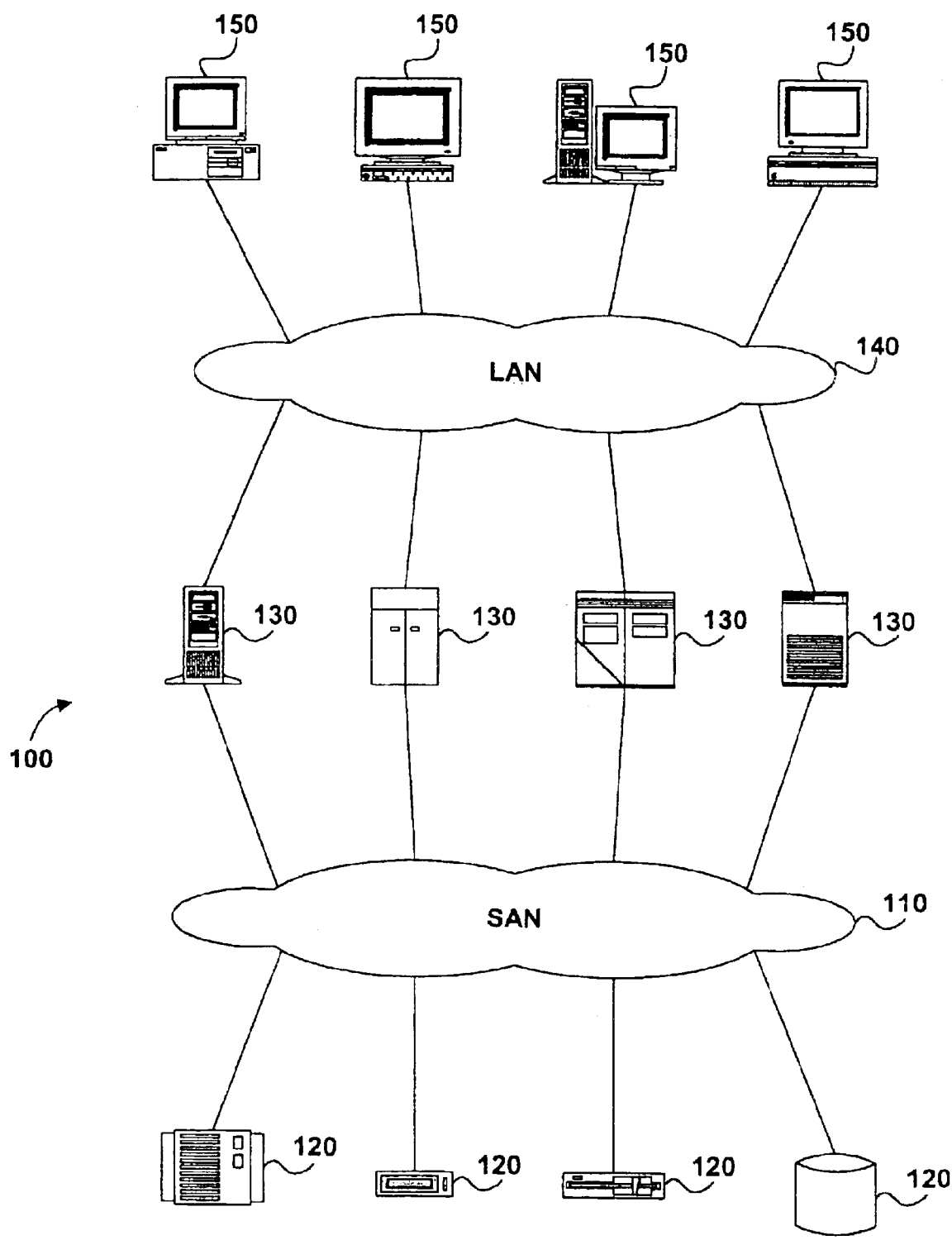
FIG. 1 is an illustration of a prior art Storage Area Network.
Figure 2:
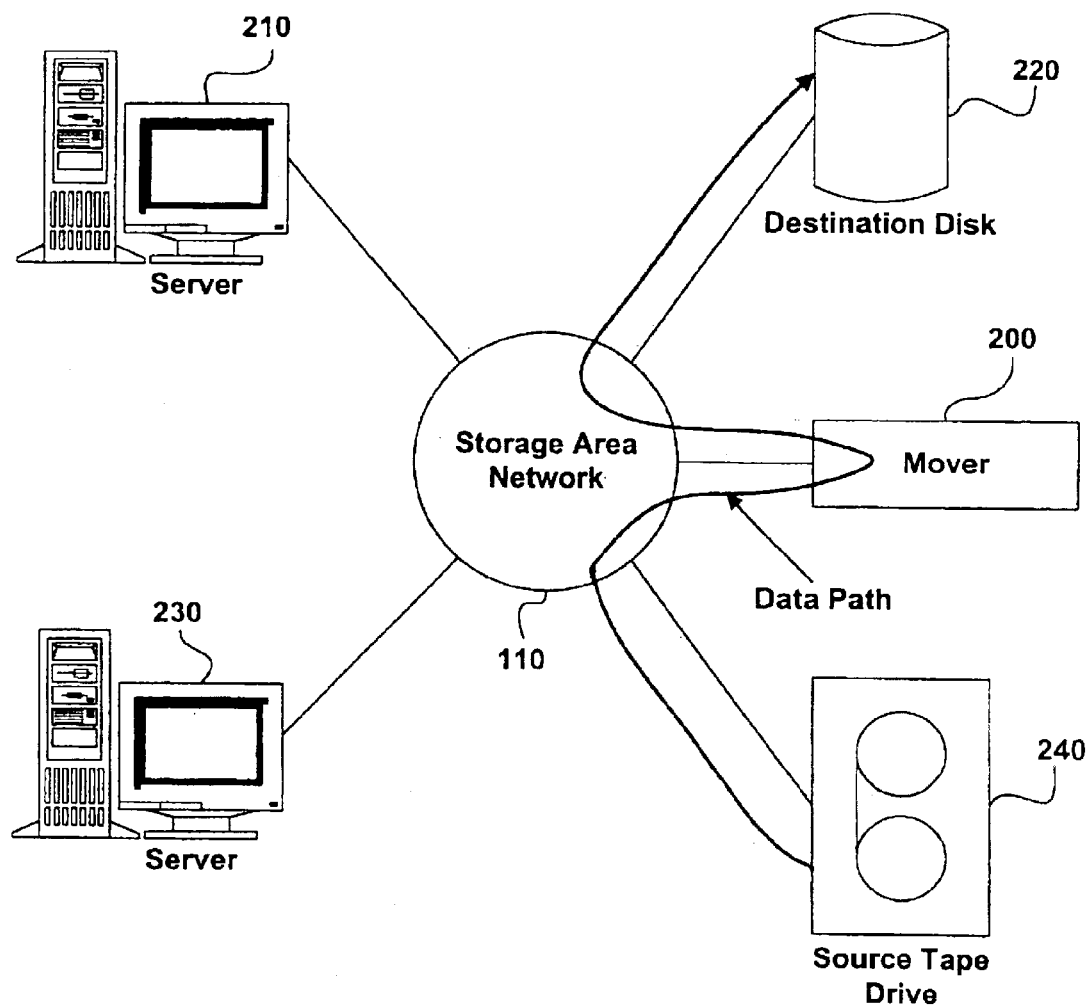
FIG. 2 is an illustration of a prior art Storage Area Network showing a source device, a destination device and a data mover.
Figure 3:
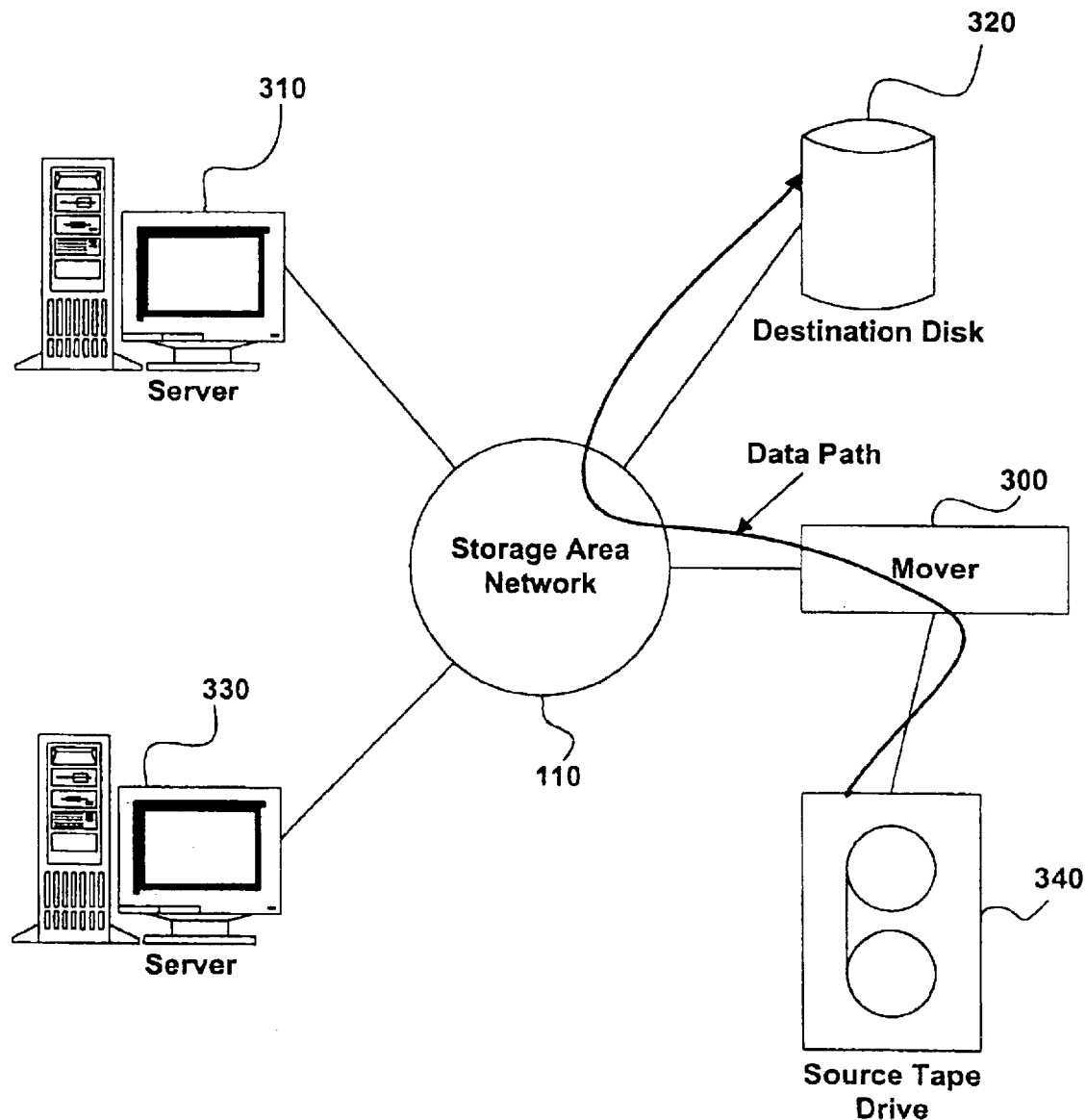
FIG. 3 is an illustration of an alternate prior art Storage Area Network topology showing a source device, a destination device and a data mover.
Figure 4:
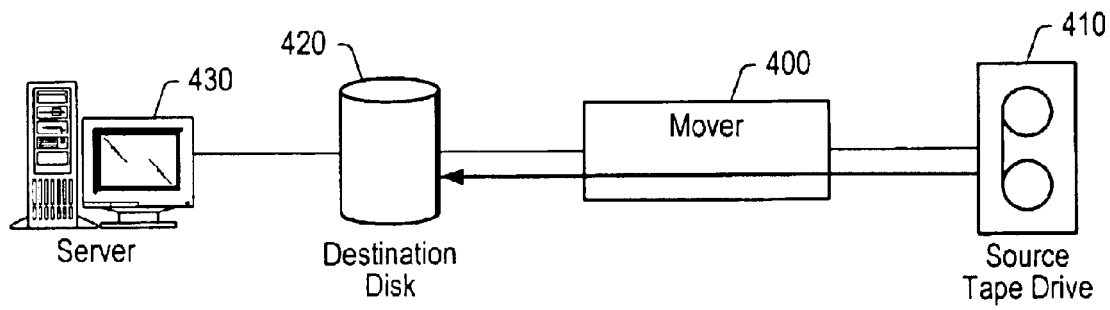
FIG. 4 is an illustration of a prior art proprietary Storage Area Network topology.
Figure 5:
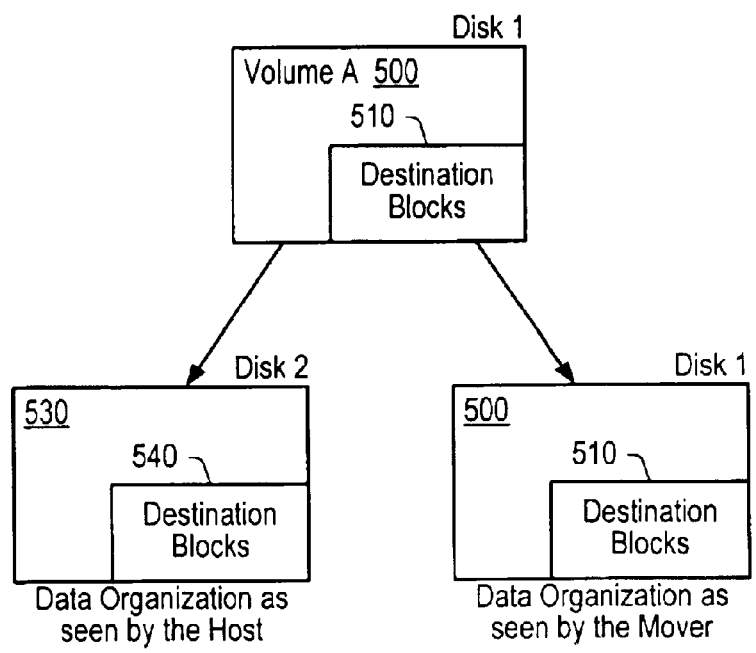
FIG. 5 is an illustration showing a first sector slipping error state caused by volume reorganization.
Figure 6:
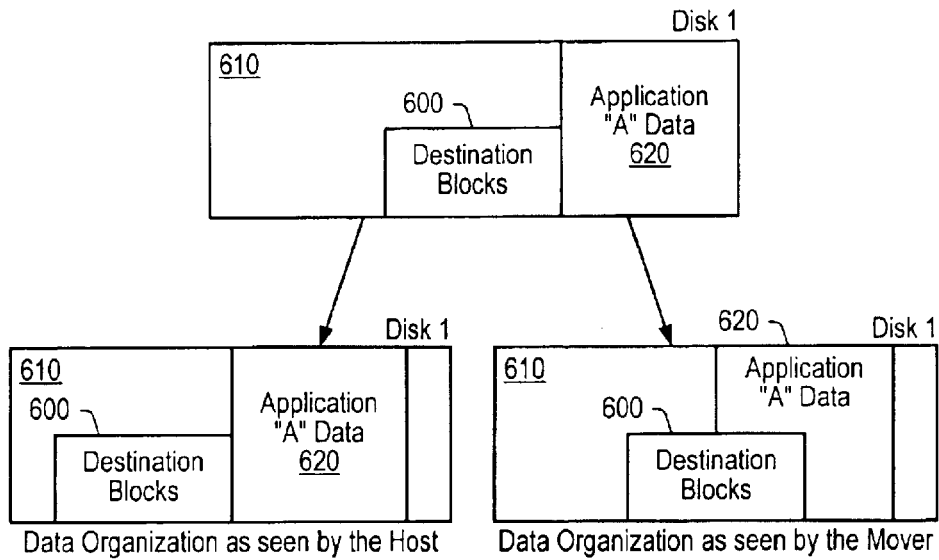
FIG. 6 is an illustration showing a second sector slipping error state caused by overwriting data following a volume reorganization.
Figure 7:
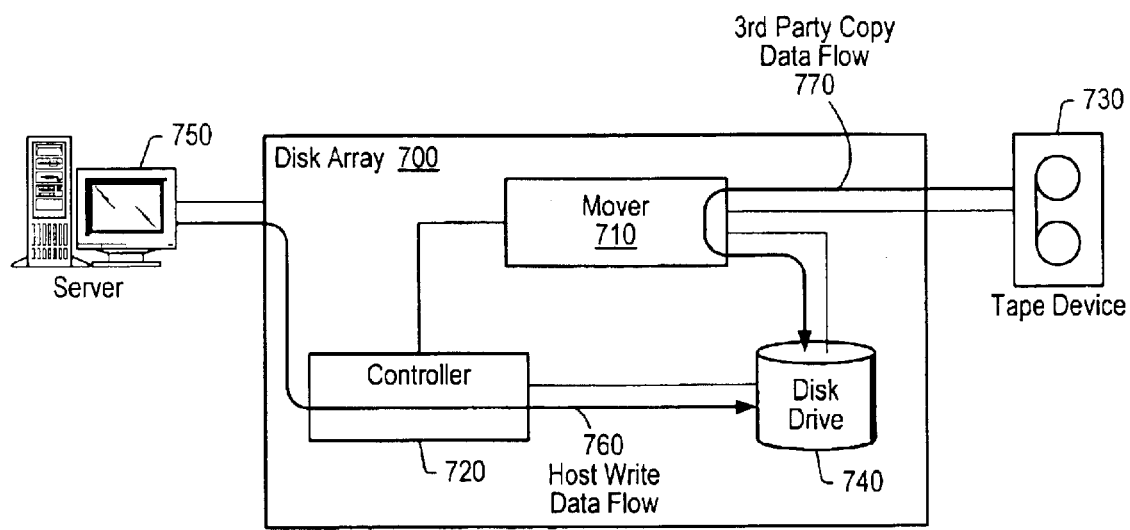
FIG. 7 is an illustration of a preferred topology of the present invention.

The present invention is directed to a block protection scheme in a disk array or controller that monitors for write activity to a protected area of storage within the disk array. Such protected storage includes destination extents generated by a third party copy. As illustrated in FIG. 7, a disk array 700 includes the functionality of a data mover represented as data mover 710. Alternatively, the data mover 710 could be disposed externally from the disk array 700 so long as the operation of the data mover 710 is tightly coupled to a disk array controller 720.

With continued reference to FIG. 7, a data source such as tape device 730 is coupled to disk array 700, either directly or through a SAN (not shown). The disk array 700 is in turn coupled to an application server 750. Host write data flow 760 shows the flow of data written to a disk drive 740 from the application server 750. Third party copy data flow 770 shows the flow of data written to the disk drive 740 from the tape device 730.

In one aspect of the invention, the data mover 710 intercommunicates with the controller 720 such that the controller 720 is aware of the extents that the data mover 710 is moving between the tape device 730 and the disk drive 740. If the controller 720 detects a block write request from the application server 750 that corresponds with the block number in the list of extents being moved along path 770, the controller 720 holds the write request and notifies the data mover 710 to terminate the move operation. When the move operation terminates, the controller 720 completes the write of data from the application server 750 to the disk drive 740.

Figure 8:
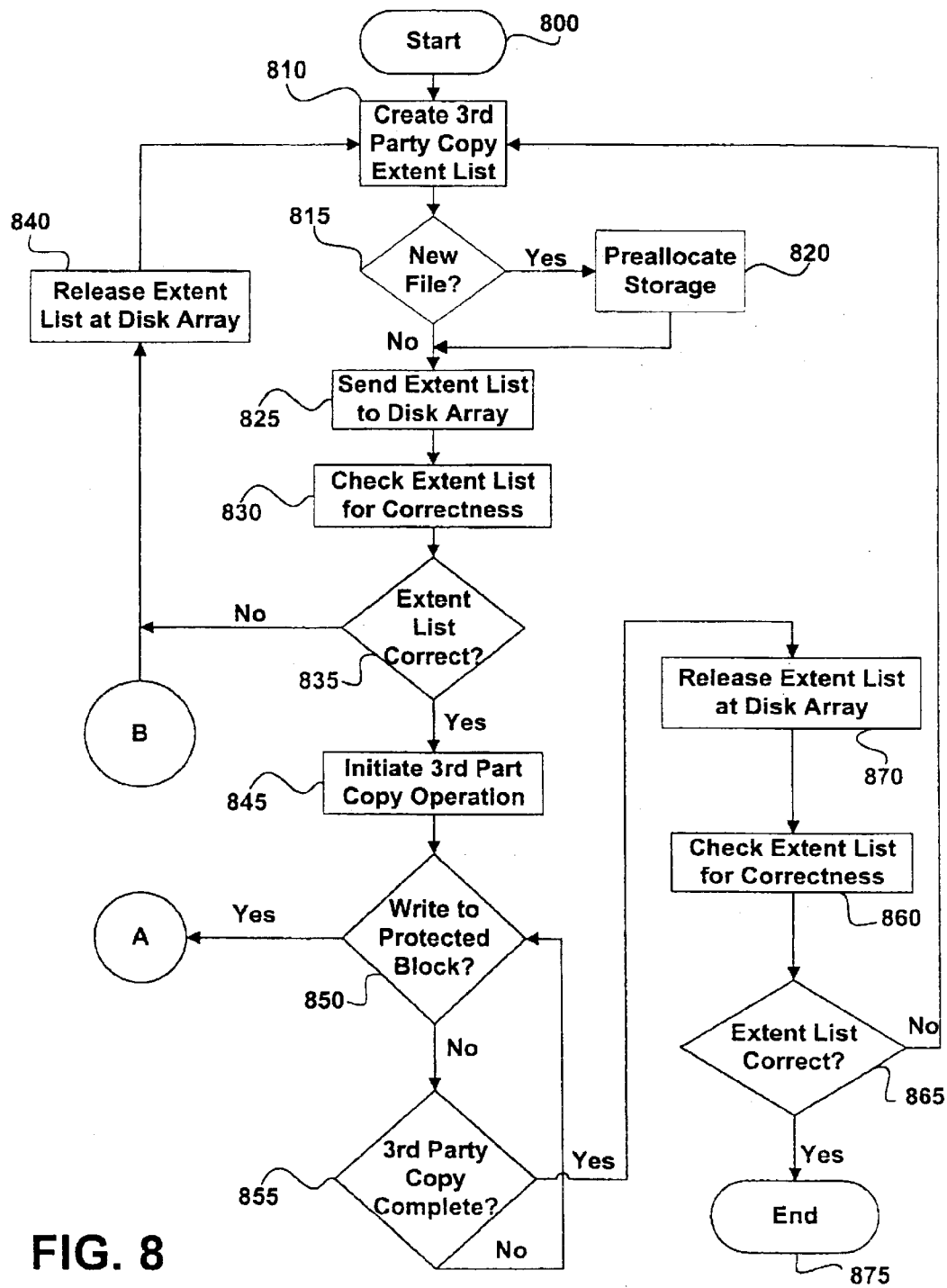
FIGS. 8 and 9 are illustrations of an algorithm according to the present invention.
Figure 9:
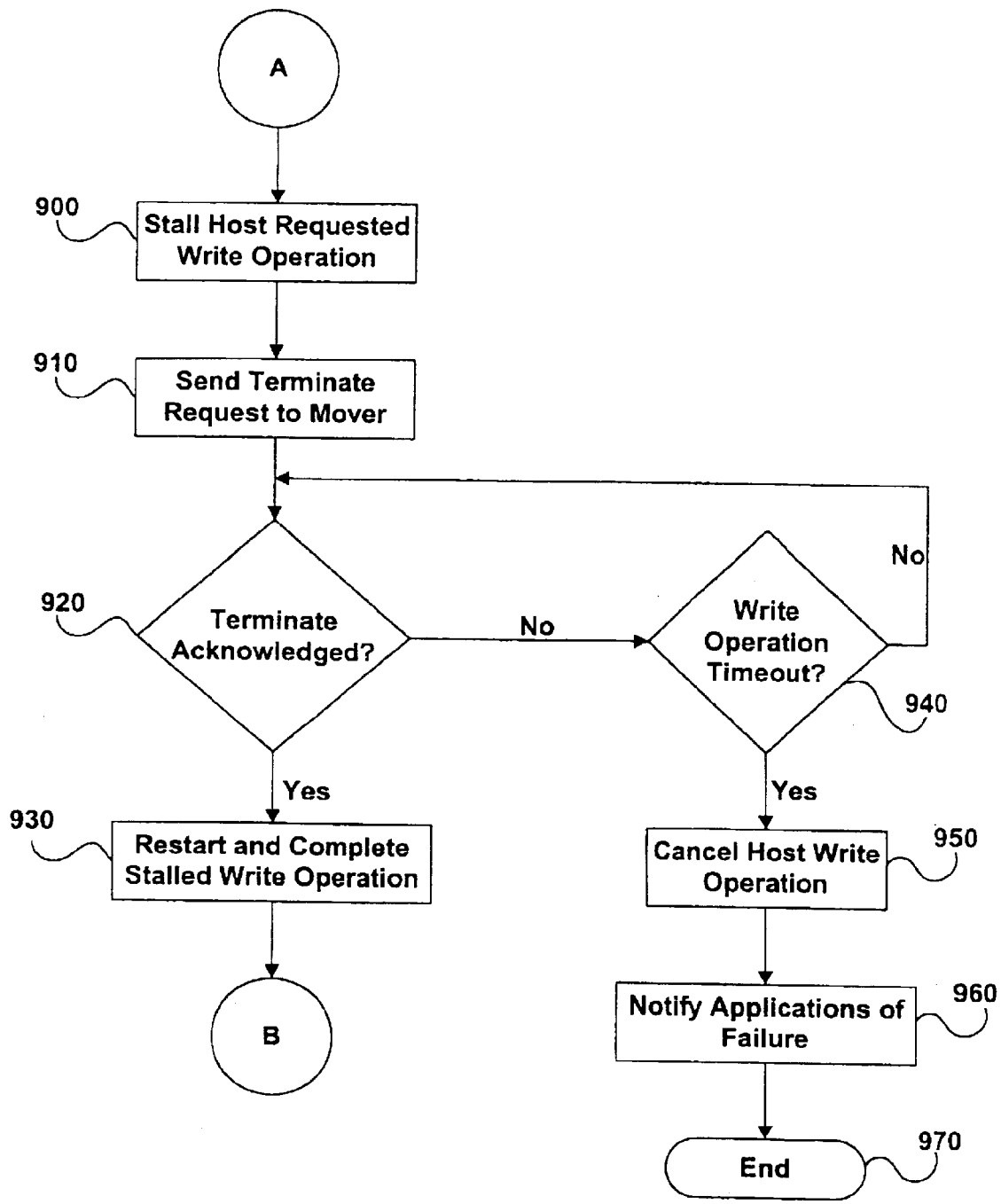

In another aspect of the invention, and as illustrated in FIG. 8 and FIG. 9, an algorithm is provided for ensuring the integrity of data moved or written to the disk drive 740 (FIG. 7). A third party copy operation begins 800 and an extent list is derived 810 that describes an object being moved. The extent list is derived at the application server 750 (FIG. 7). If data is being written to a new file or data space, a decision is made 815 and storage is pre-allocated 820 on the disk drive 740 to store the object. The pre-allocation also takes place at the application server 750 (FIG. 7).

Once the extent list is derived, the extent list is sent 825 to the disk array 700 (FIG. 7). The extent list describes the extents to be written by the third party copy operation and, within the disk array 700, is sent to both the mover 710 and the controller 720 to both establish the extents to be moved by the mover 710 as well as the extents to be protected by the controller 720. The extent list may alternatively be sent directly to the mover 710 and controller 720 in order or, in the alternative, to the controller 720 and the mover 710 in order. In either case a first recipient device forwards the extent list to a subsequent recipient device. When the extent list has been received by the controller 720, it immediately begins to monitor for any write operations to the protected storage area.

Once both the mover 710 and the controller 720 verify receipt of the extent list, the extent list is checked 830 by the application server 750 (FIG. 7) to verify that the extent list is still correct. The extent list can be verified by either re-mapping the object being copied and comparing the two maps or by checking a configuration ID of the object to see if it indicates that a change has occurred. The configuration ID is maintained by the file system, volume manager, or database and can be used by an external program to identify if changes have been made to a specified object.

If it is determined 835 that the extent list is not valid, then the extent list is released 840 at the disk array 700 by the application server (FIG. 7) and the process returns to block 810. If on the other hand the extent list is valid, the third party copy operation is initiated 845.

If the controller 720 (FIG. 7) receives 850 a write request to the protected blocks from the application server 750 (FIG. 7) then the write request is stalled 900 and a request to terminate the third party copy is sent 910 to the data mover 710 (FIG. 7) as illustrated in FIG. 9. If the termination request is acknowledged 920 by the data mover 710 (FIG. 7), then the stalled write request is completed 930 and the copy application notified of the overwrites occurrence. The application server 750 (FIG. 7) then releases the extent list 840 (FIG. 8) at the disk array 700 (FIG. 7).

If on the other hand the termination request is not acknowledged 920 (FIG. 9) a determination is made 940 whether the write request has timed out. If it has not timed out, then processing returns to 920 to check for the data mover acknowledgment. Otherwise, the write request is cancelled 950 and the server 750 notified 960 of a failed write. The copy operation is also notified 960 of a failure and the process ends 970.

With reference to FIG. 8, if there is no intervening write operation 850, then a determination 855 is made whether the third party copy has completed. If it has not, processing returns to 850 to check for a write request to the protected blocks.

If it is determined 855 that the third party copy operation has completed, then the application server 750 (FIG. 7) is notified of the completion of the operation and the extent list is released 870 at the disk array 700 (FIG. 7). The extent list is again checked for correctness 860 either by re-mapping the copied object or checking the configuration ID of the object. If there has been no change to the extent list 865 then the process ends 875. If on the other hand the extent list has changed, processing returns to the creation 810 of an updated extent list and the copy operation is repeated to the newly mapped space.

Accordingly, the algorithm ensures the correctness of the data moved when using a third party copy operation to move data into a live storage environment. The first sector slipping error state (volume reorganization) is avoided by checking the extent list for correctness 860 after the completion of the third party copy operation 855. If the extent list is incorrect due to a reallocation of disk space, the copy operation is repeated using the new extent list. The second sector slipping error state (volume reorganization with overwrite) is avoided by stalling the host write request 900 until either the copy manager acknowledges the termination request or the host write request times out 940 and the write request is cancelled 950.

In accordance with the provisions of the patent statutes, the principle and mode of operation of the invention have been explained and illustrated in its preferred embodiment. However, it must be understood that this invention may be practiced otherwise than as specifically explained and illustrated without departing from its spirit or scope. For example, while the preferred embodiment has been illustrated and described in the context of a SAN, it will be appreciated that the invention can be practiced with other network topologies.

I claim:

1. A method for ensuring the integrity of a storage device comprising:

initiating a data mover operation to move an object to the storage device;

deriving an extent list describing destination blocks on the storage device, wherein the destination blocks comprise a location to which the object is being moved by the data mover operation;

transmitting the extent list to a disk array;

verifying the extent list;

monitoring for a write request from an application server during the data mover operation;

if a write request is detected during the monitoring for the write request, stalling the write request and requesting a termination of the data mover operation;

terminating the data mover operation in response to the requesting the termination of the data mover operation;

completing the write request after the termination of the data mover operation;

releasing the extent list at the disk array after the completing the write request; and re-verifying the extent list after the releasing the extent list.

2. A computer readable medium containing computer readable instructions, wherein the computer readable instructions are computer executable to implement:

initiating a data mover operation to move an object to a storage device;

deriving an extent list describing destination blocks on the storage device, wherein the destination blocks comprise a location to which the object is being moved by the data mover operation;

transmitting the extent list to a disk array;

verifying the extent list;

monitoring for a write request from an application server during the data mover operation;

if a write request is detected during the monitoring for the write request, stalling the write request and requesting a termination of the data mover operation;

terminating the data mover operation in response to the requesting the termination of the data mover operation;

completing the write request after the termination of the data mover operation;

releasing the extent list at the disk array after the completing the write request; and re-verifying the extent list after the releasing the extent list.

* * * * *